(12) United States Patent
Liu

(10) Patent No.: US 9,396,689 B2
(45) Date of Patent: Jul. 19, 2016

(54) DRIVING METHOD FOR A PIXEL ARRAY OF A DISPLAY

(76) Inventor: Hung-Ta Liu, Hsinchu County (TW)

( * ) Notice: Subject to any disclaimer, the term of this patent is extended or adjusted under 35 U.S.C. 154(b) by 0 days.

(21) Appl. No.: 13/598,627

(22) Filed: Aug. 30, 2012

(65) Prior Publication Data

US 2012/0320009 A1   Dec. 20, 2012

Related U.S. Application Data

(63) Continuation-in-part of application No. 13/338,250, filed on Dec. 28, 2011, now Pat. No. 8,971,228.

(30) Foreign Application Priority Data

Dec. 31, 2010 (TW) ............................. 99147378 A
Aug. 31, 2011 (TW) ............................. 100131366 A

(51) Int. Cl.
*G09G 3/36* (2006.01)
*G02F 1/1343* (2006.01)
*G02F 1/1362* (2006.01)

(52) U.S. Cl.
CPC ............ *G09G 3/3648* (2013.01); *G09G 3/3614* (2013.01); *G02F 1/134363* (2013.01); *G02F 1/136213* (2013.01); *G02F 2001/134372* (2013.01); *G09G 2320/10* (2013.01); *G09G 2330/021* (2013.01); *G09G 2340/0435* (2013.01)

(58) Field of Classification Search
CPC ................ G09G 3/3611–3/3614; G09G 3/36; G09G 5/00; G06F 3/038; G02F 1/141

USPC ........................................................... 345/96
See application file for complete search history.

(56) References Cited

U.S. PATENT DOCUMENTS

| 7,737,935 | B2 * | 6/2010 | Kim ..................... G09G 3/3677 345/100 |
| 8,031,154 | B2 * | 10/2011 | Mamba et al. ................... 345/96 |
| 8,164,556 | B2 * | 4/2012 | Song et al. ...................... 345/95 |
| 2004/0041760 | A1 * | 3/2004 | Tsumura et al. ................ 345/87 |
| 2006/0119559 | A1 * | 6/2006 | Jung et al. ....................... 345/96 |
| 2007/0040823 | A1 * | 2/2007 | Hiroki et al. .................. 345/209 |
| 2008/0012814 | A1 * | 1/2008 | Kim ..................... G09G 3/3614 345/96 |
| 2009/0073103 | A1 | 3/2009 | Tajiri |

FOREIGN PATENT DOCUMENTS

| CN | 1440514 A | 9/2003 |
| CN | 1173324 C | 10/2004 |
| CN | 1178197 C | 12/2004 |
| CN | 1790470 A | 6/2006 |
| CN | 101154368 A | 4/2008 |
| CN | 101178881 A | 5/2008 |

(Continued)

*Primary Examiner* — Pegeman Karimi
(74) *Attorney, Agent, or Firm* — CKC & Partners Co., Ltd.

(57) ABSTRACT

A driving method for a display is provided. This display includes a first driver, a second driver, a plurality of first signal lines coupling with the first driver, and a plurality of second signal lines coupling with the second driver. The first lines cross the second lines to form a pixel array with a plurality of pixels. The driving method includes the following steps. First, an image signal with a polarity is applied to the pixel array. The polarity is a first polarity or a second polarity opposite to the first polarity. Then, the image signal applied to at least one pixel of the pixel array is maintained in a same polarity during two successive frames.

22 Claims, 12 Drawing Sheets

(56) References Cited

FOREIGN PATENT DOCUMENTS

| | | |
|---|---|---|
| CN | 101188091 A | 5/2008 |
| CN | 101211029 A | 7/2008 |
| CN | 101231808 A | 7/2008 |
| CN | 101763841 A | 6/2010 |
| CN | 101819754 A | 9/2010 |
| CN | 101901575 A | 12/2010 |
| JP | 2005-345685 A | 12/2005 |
| JP | 2009-075392 A | 4/2009 |
| TW | 200715253 A | 4/2007 |
| TW | 200721507 A | 6/2007 |
| TW | I302282 B | 10/2008 |
| TW | 200842786 A | 11/2008 |
| TW | I317119 B | 11/2009 |
| TW | 201030721 A | 8/2010 |
| TW | 201110102 A | 3/2011 |

\* cited by examiner

| column (1) | column (2) | column (3) | column (4) | column (5) | column (6) | | frame (N) |
|---|---|---|---|---|---|---|---|
| + | − | + | − | + | − | ...... | row(1) |
| + | − | + | − | + | − | ...... | row(2) |
| + | − | + | − | + | − | ...... | row(3) |
| + | − | + | − | + | − | ...... | row(n) |
| + | − | + | − | + | − | ...... | row(n+1) |
| + | − | + | − | + | − | ...... | row(n+2) |

| column (1) | column (2) | column (3) | column (4) | column (5) | column (6) | | frame (N+1) |
|---|---|---|---|---|---|---|---|
| + | − | + | − | + | − | ...... | row(1) |
| + | − | + | − | + | − | ...... | row(2) |
| + | − | + | − | + | − | ...... | row(3) |
| + | − | + | − | + | − | ...... | row(n) |
| + | − | + | − | + | − | ...... | row(n+1) |
| + | − | + | − | + | − | ...... | row(n+2) |

| column (1) | column (2) | column (3) | column (4) | column (5) | column (6) | | frame (N+2) |
|---|---|---|---|---|---|---|---|
| − | + | − | + | − | + | ...... | row(1) |
| − | + | − | + | − | + | ...... | row(2) |
| − | + | − | + | − | + | ...... | row(3) |
| − | + | − | + | − | + | ...... | row(n) |
| − | + | − | + | − | + | ...... | row(n+1) |
| − | + | − | + | − | + | ...... | row(n+2) |

| column (1) | column (2) | column (3) | column (4) | column (5) | column (6) | | frame (N+3) |
|---|---|---|---|---|---|---|---|
| − | + | − | + | − | + | ...... | row(1) |
| − | + | − | + | − | + | ...... | row(2) |
| − | + | − | + | − | + | ...... | row(3) |
| − | + | − | + | − | + | ...... | row(n) |
| − | + | − | + | − | + | ...... | row(n+1) |
| − | + | − | + | − | + | ...... | row(n+2) |

Fig. 6C

| | column (1) | column (2) | column (3) | column (4) | column (5) | column (6) | | frame (N) |
|---|---|---|---|---|---|---|---|---|
| | + | + | + | − | − | − | ...... | row(1) |
| | + | + | + | − | − | − | ...... | row(2) |
| | + | + | + | − | − | − | ...... | row(3) |
| | + | + | + | − | − | − | ...... | row(n) |
| | + | + | + | − | − | − | ...... | row(n+1) |
| | + | + | + | − | − | − | ...... | row(n+2) |

| | column (1) | column (2) | column (3) | column (4) | column (5) | column (6) | | frame (N+1) |
|---|---|---|---|---|---|---|---|---|
| | + | + | + | − | − | − | ...... | row(1) |
| | + | + | + | − | − | − | ...... | row(2) |
| | + | + | + | − | − | − | ...... | row(3) |
| | + | + | + | − | − | − | ...... | row(n) |
| | + | + | + | − | − | − | ...... | row(n+1) |
| | + | + | + | − | − | − | ...... | row(n+2) |

| | column (1) | column (2) | column (3) | column (4) | column (5) | column (6) | | frame (N+2) |
|---|---|---|---|---|---|---|---|---|
| | − | − | − | + | + | + | ...... | row(1) |
| | − | − | − | + | + | + | ...... | row(2) |
| | − | − | − | + | + | + | ...... | row(3) |
| | − | − | − | + | + | + | ...... | row(n) |
| | − | − | − | + | + | + | ...... | row(n+1) |
| | − | − | − | + | + | + | ...... | row(n+2) |

| | column (1) | column (2) | column (3) | column (4) | column (5) | column (6) | | frame (N+3) |
|---|---|---|---|---|---|---|---|---|
| | − | − | − | + | + | + | ...... | row(1) |
| | − | − | − | + | + | + | ...... | row(2) |
| | − | − | − | + | + | + | ...... | row(3) |
| | − | − | − | + | + | + | ...... | row(n) |
| | − | − | − | + | + | + | ...... | row(n+1) |
| | − | − | − | + | + | + | ...... | row(n+2) |

Fig. 6D

DRIVING METHOD FOR A PIXEL ARRAY OF A DISPLAY

RELATED APPLICATIONS

This application is a continuation-in-part of U.S. application Ser. No. 13/338,250, filed Dec. 28, 2011, which claims priority to Taiwan Application Serial Number 099147378, filed Dec. 31, 2010, currently pending. The present application is also based on, and claims priority from Taiwan Application Serial Number 100131366 filed Aug. 31, 2011. All of these applications are incorporated herein by this reference.

BACKGROUND

1. Field of Invention

The present invention relates to a driving method, and more particularly to a driving Method and a display panel using the method.

2. Description of Related Art

A liquid crystal display utilizes liquid crystal molecules to control light transmission in each pixel. The liquid crystal molecules are driven according to external video signals received by the liquid crystal display. A conventional liquid crystal display generally employs a selected one of a frame inversion mode, a column inversion mode, a line/row inversion mode and a dot inversion mode to drive the liquid crystal molecules. Each of these driving systems can protect the liquid crystal molecules from decay or damage.

FIG. 1 to FIG. 4 show the polarity of the source output signals and accordingly the sub-pixels in three consecutive frames under the four driving modes, respectively. Under the four driving modes, every time a frame is changed, the polarity of sub-pixels is changed from positive (+) to negative (−) or from negative (−) to positive (+). In FIG. 1 to FIG. 4 only three consecutive frames are shown.

As shown in FIG. 1, in the frame inversion mode, the polarity of all sub-pixels in the panel is the same, either positive or negative. If the polarity of all sub-pixels is positive in the first frame, then changed into negative in the second frame, and then changed into positive in the third frame.

As shown in FIG. 2, in the column inversion mode, the polarity of all sub-pixels in the same column is all the same (either positive or negative) but is inverted in the next column. For example, in the first frame, the polarity of all sub-pixels in the first column are positive, the polarity of all sub-pixels in the second column are negative, and the polarity of all sub-pixels in the third column are positive. When the frame is changed into the second frame, the polarity of all sub-pixels in the first column is inverted into negative, the polarity of all sub-pixels in the second column is inverted into positive, and the polarity of all sub-pixels in the third column is inverted into negative. When the frame is changed into the third frame, the polarity of all sub-pixels in the first column is inverted into positive, the polarity of all sub-pixels in the second column is inverted into negative, and the polarity of all sub-pixels in the third column is inverted into positive.

As shown in FIG. 3, in the row inversion mode, the polarity of all sub-pixels in the same row is the same (either positive or negative) but is inverted in the next row. For example, in the first frame, the polarity of all sub-pixels in the first rove is positive and the polarity of all sub-pixels in second row is negative. When the frame is changed into the second frame, the polarity of all sub-pixels in first row is inverted into negative and the polarity of all sub-pixels in second row is inverted into positive. When the frame is changed into the third frame, the polarity of all sub-pixels in first row is inverted into positive and the polarity of all sub-pixels in second row is inverted into negative.

As shown in FIG. 4, in the dot inversion mode, the polarity of any adjacent sub-pixels is different from each other. For example, in the first frame, the polarity of the sub-pixel located in the crossing position of first row and first column is positive, but the polarity of its adjacent sub-pixels located in the crossing position of first row and second column and the crossing position of second row and first column is both negative. When the frame is changed into the second frame, the polarity of sub-pixel located in the crossing position of first row and first column is negative, but the polarity of its adjacent sub-pixels located in the crossing position of first row and second column and the crossing position of second row and first column is both positive. When the frame is changed into the third frame, the polarity of sub-pixel located in the crossing position of first row and first column is positive, but the polarity of its adjacent sub-pixels located in the crossing position of first row and second column and the crossing position of second row and first column is both negative.

In the above four driving modes, every time a frame is changed, the polarity of sub-pixels is changed from positive (+) to negative (−) or from negative (−) to positive (+). Such driving modes increases overall power consumption of the display panel system. Moreover, the refresh rate for a liquid crystal display is always kept in 60 Hz or 75 Hz even though the liquid crystal display only displays static images. Such refresh rate causes additional power consumption.

SUMMARY

One aspect of the present invention is to provide a driving method for a display. The driving method reduces the number of the polarity of pixels changed from positive (+) to negative (−) or from negative (−) to positive (+) to reduce the power consumption of a display.

One aspect of the present invention is to provide a driving method for a display. The driving method reduces the work time of the gate driver and/or the source driver to reduce power consumption of a display. When the gate driver or the source driver is not operated in a working state, the drive voltage or drive current supplied to the gate driver or the source driver is reduced or is stopped. Therefore, the power consumption may be reduced. Moreover, by this way, the refresh rate is also reduced.

One aspect of the present invention is to provide a driving method for a display or a liquid crystal display. The driving method reduces the power supplied to the source driver to reduce power consumption of a display. Moreover, by this way, the refresh rate is also reduced.

Accordingly, a driving method for a display is provided. This display includes a first driver, a second driver, a plurality of first signal lines coupling with the first driver, and a plurality of second signal lines coupling with the second driver. The first lines cross the second lines to form a pixel array with a plurality of pixels. The driving method includes the following steps. First, an image signal with a polarity is applied to the pixel array. The polarity is a first polarity or a second polarity opposite to the first polarity. Then, the image signal applied to at least one pixel of the pixel array is maintained in a same polarity during two successive frames.

In one embodiment, the driving method further comprises the image applied to pixels arranged in a same row of the pixel array is maintained in a same polarity during two successive frames.

In one embodiment, the driving method further comprises the image signal applied to at least one pixel or pixels arranged in a same row of the pixel array is maintained in a same polarity during at least six successive frames.

In one embodiment, the image signal is a voltage signal or a current signal.

In one embodiment, the driving method further comprises to apply the image signal to some pixels of the pixel array in a first time period in a frame, and to stop applying the image signal to the some pixels of the pixel array in a second time period in the frame.

In one embodiment, the second driver selects the some pixels of the pixel array through the second signal lines, and the first driver applies the image signal to the some pixels through the first lines signals.

In one embodiment, the voltage and the current supplied to the second driver and the first driver in the second time period is stopped or is reduced.

In one embodiment, power supplied to the second driver and the first driver in the second time period is less than power supplied to the second driver and the first driver in the first time period.

In one embodiment, an average power supplied to the second driver and the first driver in the second time period is less than an average power supplied to the second driver and the first driver in the first time period.

In one embodiment, the frame includes a plurality of the first time period and the second time period.

In one embodiment, (the first time period)/(the first time period+the second time period) is larger than 0.3.

In one embodiment, the step to apply voltage signal to the pixel array further comprises to divide the pixel array into a plurality sub-pixel arrays. An image signal is applied to the sub-pixel arrays respectively during a plurality of time periods in a frame. The image signal is stopped to apply to the sub-pixel arrays respectively during other time periods in the frame.

In one embodiment, an image signal is applied to the pixel array further comprises to apply the first polarity signal and the second polarity signal to the pixels arranged in any two adjacent column, any two adjacent rows or any two adjacent pixels of the pixel array.

In one embodiment, an image signal is applied to the pixel array further comprises to apply the first polarity signal or the second polarity signal to the all pixels in the pixel array.

In one embodiment, an image signal is applied to the pixel array further comprises to apply the first polarity signal or the second polarity signal to the pixels arranged in any two adjacent column, any two adjacent rows or any two adjacent pixels of the pixel array.

In one embodiment, each pixel includes at least two thin film transistors, a two gates thin film transistors or a thin film transistor with a light doped drain electrode.

In one embodiment, each pixel includes an amorphous silicon thin film transistors or an oxide thin film transistor.

In one embodiment, when the frames of the display are switched in a first frequency, the second driver drives the second signal lines in a second frequency. The second frequency is larger than the first frequency.

In one embodiment, the display is a liquid crystal display, an OLED display, a MEMS display, an Electrophoresis display, an Electrowetting display, an active array display, or a silicon based display.

A display is also provided. This display includes a timing controller and a driver for performing the above method. The display is a liquid crystal display, an OLEO display, a MEMS display, an Electrophoresis display, an Electrowetting display, an active array display, or a silicon based display.

A driving method for a display is provided. The display includes a first driver, a second driver, a plurality of first signal lines coupling with the first driver, and a plurality of second signal lines coupling with the second driver. The first lines cross the second lines to form a pixel array with a plurality of pixels. The driving method includes the following steps. First, an image signal with a polarity is applied to some pixels of the pixel array in a first time period in a frame. Then, the image signal is stopped to apply to the some pixels in a second time period of the frame.

In one embodiment, the frame includes a plurality of the first time period and the second time period.

In one embodiment, the second driver selects the some pixels of the pixel array through the second signal lines, and the first driver applies the image signal to the some pixels through the first lines signals.

In one embodiment, the voltage and the current supplied to the second driver and the first driver in the second time period is stopped or is reduced.

In one embodiment, the first driver and the second driver is in a sleeping state or a non-working state in the second time period.

In one embodiment, power supplied to the second driver and the first driver in the second time period is less than power supplied to the second driver and the first driver in the first time period.

In one embodiment, an average power supplied to the second driver and the first driver in the second time period is less than an average power supplied to the second driver and the first driver in the first time period.

In one embodiment, (the first time period)/(the first time period+the second time period) is larger than 0.3.

In one embodiment, (the first time period)/(the first time period+the second time period) is larger than 0.6.

In one embodiment, an image signal with a polarity is applied to the pixel array. The polarity is a first polarity or a second polarity opposite to the first polarity. Then, the image signal applied to at least one pixel of the pixel array is maintained in a same polarity during two successive frames.

In one embodiment, when a polarity of the image signal is switched in a first frequency, the second driver drives the second signal lines in a second frequency. The second frequency is larger than the first frequency.

In one embodiment, the first frequency is 0.1 Hz to 30 Hz. The second frequency is 40 Hz to 200 Hz.

In one embodiment, each pixel includes at least two thin film transistors, a two gates thin film transistors or a thin film transistor with a light doped drain electrode.

In one embodiment, each pixel includes an amorphous silicon thin film transistors or an oxide thin film transistor.

In one embodiment, the display is a liquid crystal display, an OLED display, a MEMS display, an Electrophoresis display, an Electrowetting display, an active array display, or a silicon based display.

Accordingly, the driving method for a display reduces the number of the polarity of pixels changed from positive (+) to negative (−) or from negative (−) to positive (+) to reduce the power consumption of a display. Moreover, the frame is also divided into at least two time periods, the first time period and the second time period. In the first time period, the gate driver or the source driver is operated in a working state. In the second time period, the gate driver or the source driver is operated in a sleeping state or in a non-working state. The source driver sends the data signal to the pixels only when the gate driver scans the scan lines in the pixels. That is, the source driver does not send any data signal to the pixels when the gate driver does not scan the scan lines in the pixels. In other words, the voltage and the current supplied to the source driver and the gate driver are reduced. Therefore, the power consumption is reduced.

BRIEF DESCRIPTION OF THE DRAWINGS

In order to make the foregoing as well as other aspects, features, advantages, and embodiments of the present invention more apparent, the accompanying drawings are described as follows:

FIG. 6C illustrates the multi-column inversion mode, the polarity of all sub-pixels in successive four frames, according to a preferred embodiment of the present invention.

FIG. 6D illustrates the multi-column inversion mode, the polarity of all sub-pixels in successive four frames, according to another preferred embodiment of the present invention.

DETAILED DESCRIPTION

Figure 1:
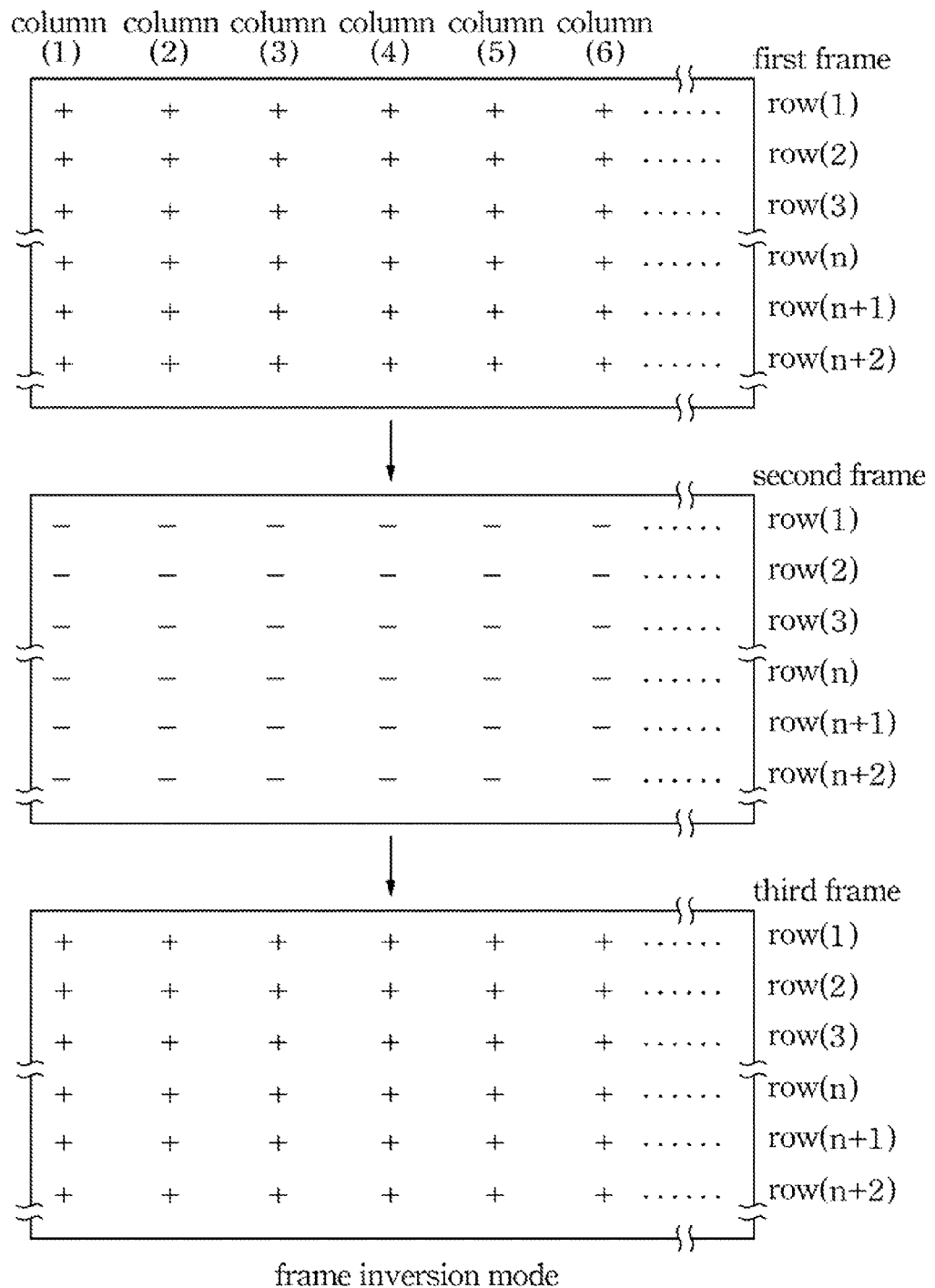
FIG. 1 illustrates the frame inversion mode, the polarity of all sub-pixels in the panel is the same, either positive or negative.
Figure 2:
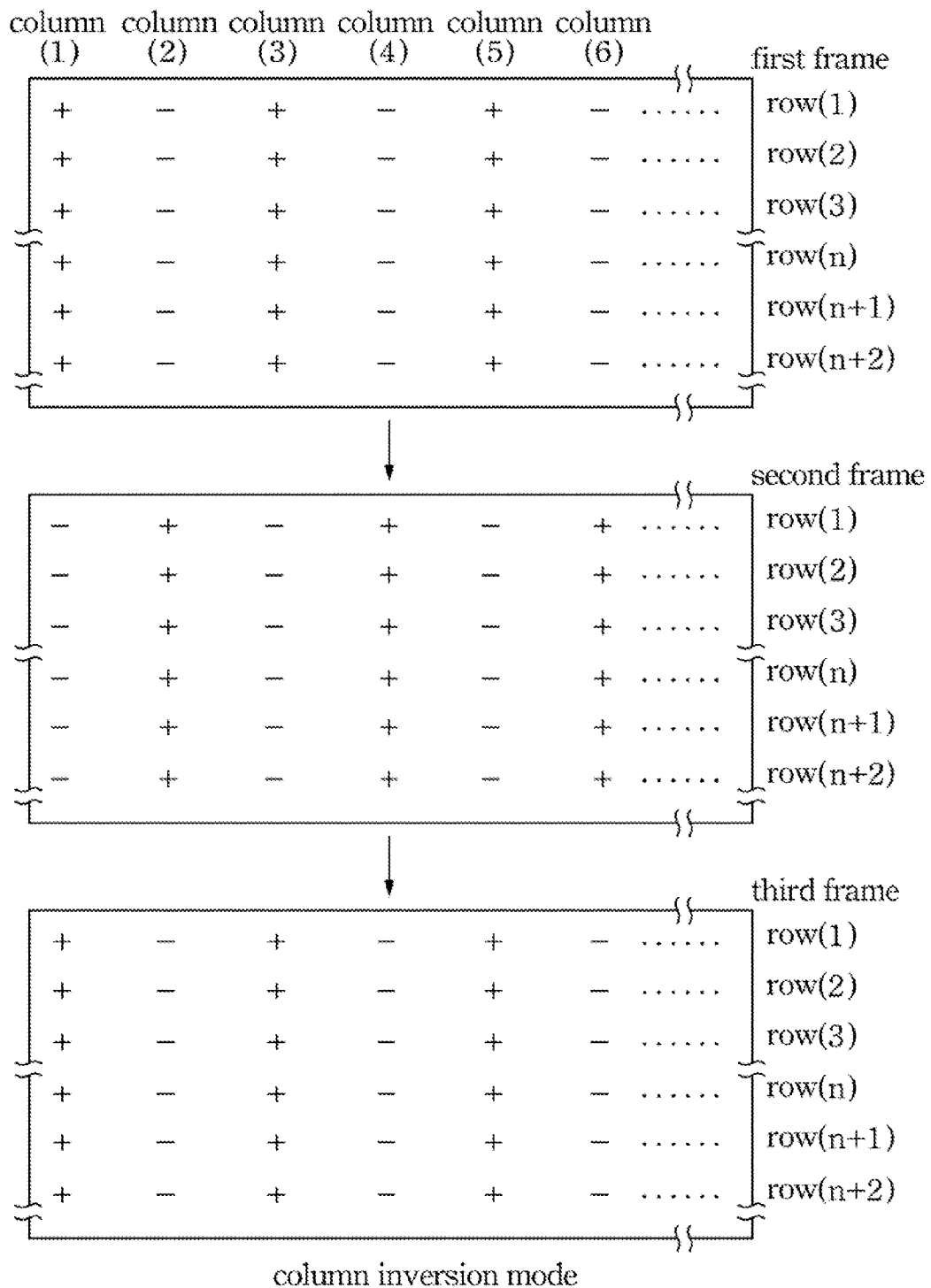
FIG. 2 illustrates the column inversion mode, the polarity of all sub-pixels in the same column is all the same (either positive or negative) but is inverted in the next column.
Figure 3:
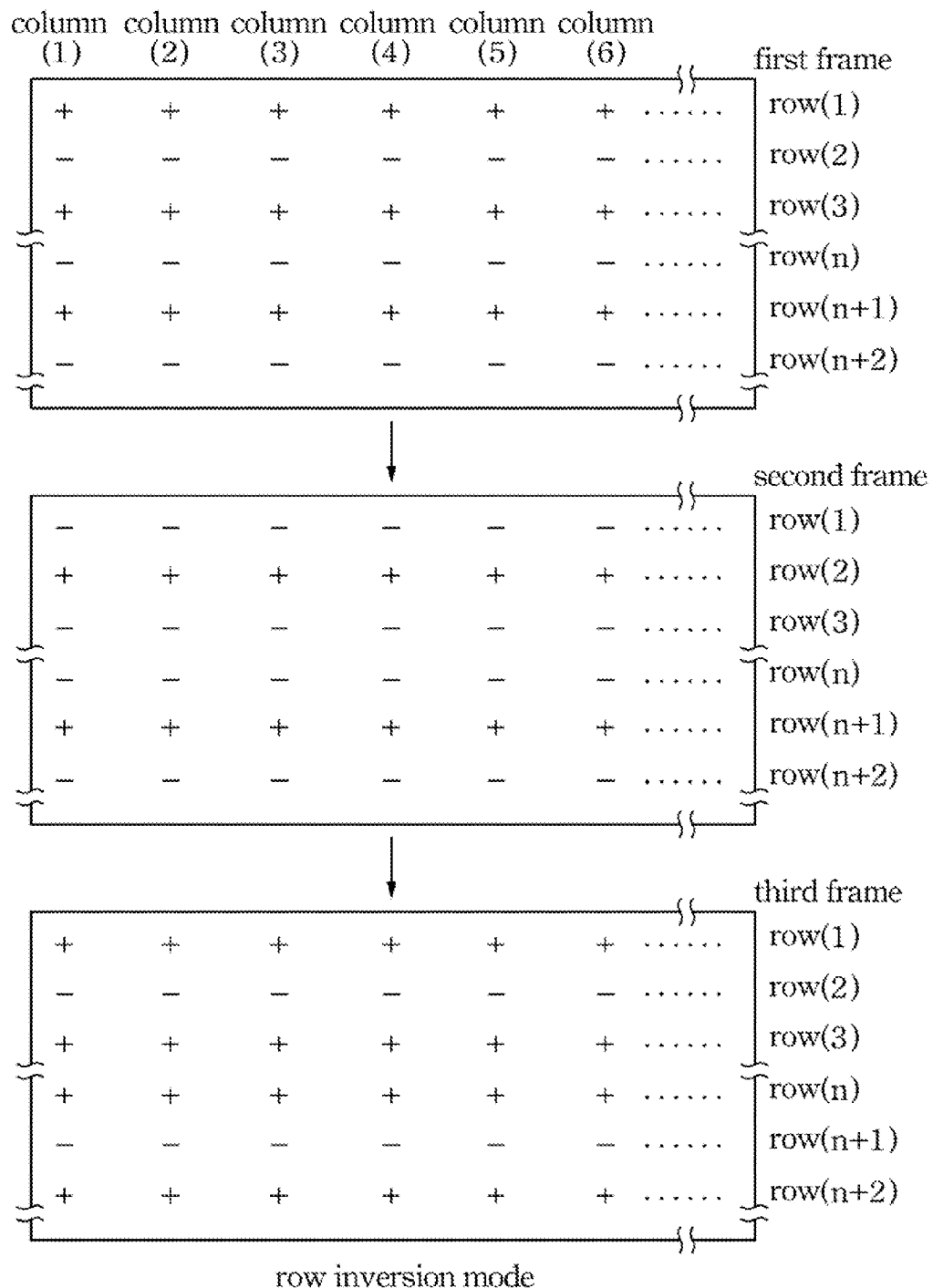
FIG. 3 illustrates the row inversion mode, the polarity of all sub-pixels in the same row is the same (either positive or negative) but is inverted in the next row.
Figure 4:
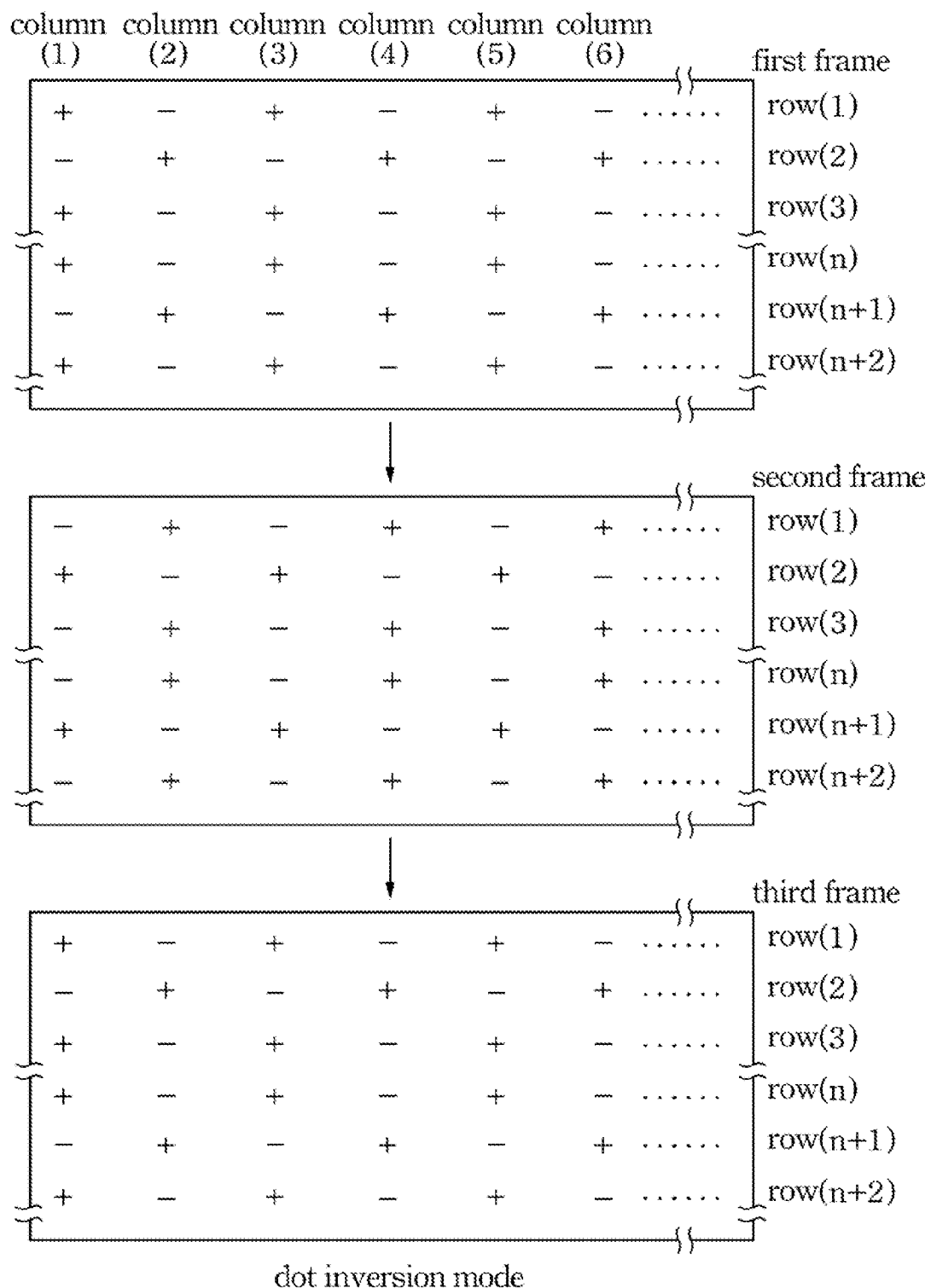
FIG. 4 illustrates the dot inversion mode, the polarity of any adjacent sub-pixels is different from each other.

Reference will now be made in detail to the present embodiments of the invention, examples of which are illustrated in the accompanying drawings. Wherever possible, the same reference numbers are used in the drawings and the description to refer to the same or like parts.

For reducing the power consumption of a liquid crystal display, the driving method of the present invention reduces the number of the polarity of pixels changed from positive (+) to negative (−) or from negative (−) to positive (+). Moreover, the driving method of the present invention also divides the frame into at least two time periods, the first time period and the second time period. In the first time period, the gate driver or/and the source driver is operated in a working state. In the second time period, the gate driver or/and the source driver is operated in a sleeping or in a non-working state. The source driver sends the data signal to the pixels only when the gate driver scans the scan lines in the pixels. That is, the source driver does not send any data signal to the pixels when the gate driver does not scan the scan lines in the pixels. In other words, the voltage and the current supplied to the source driver and the gate driver are reduced. Therefore, the power consumption of a liquid crystal display may be reduced. Accordingly, the driving method may he used to display both the dynamical image, such as a movie, animated film or a sport film, and the static image, such as a static advertisement image or a photograph.

The following examples are used to explain the present invention. The driving method of reducing the number of the polarity of pixels changed from positive (+) to negative (−) or from negative (−) to positive (+) is described first. Then, the driving method of dividing a frame into a first time period in which the gate driver or/and the source driver is operated in a working state and a second time period in which the gate driver or/and the source driver is operated in a sleeping or in a non-working state is described. A frame inversion mode is used to explain the driving method of the present invention. However, the driving method of the present invention may be applied to a column inversion mode, a row inversion mode and a dot inversion mode.

Figure 5:
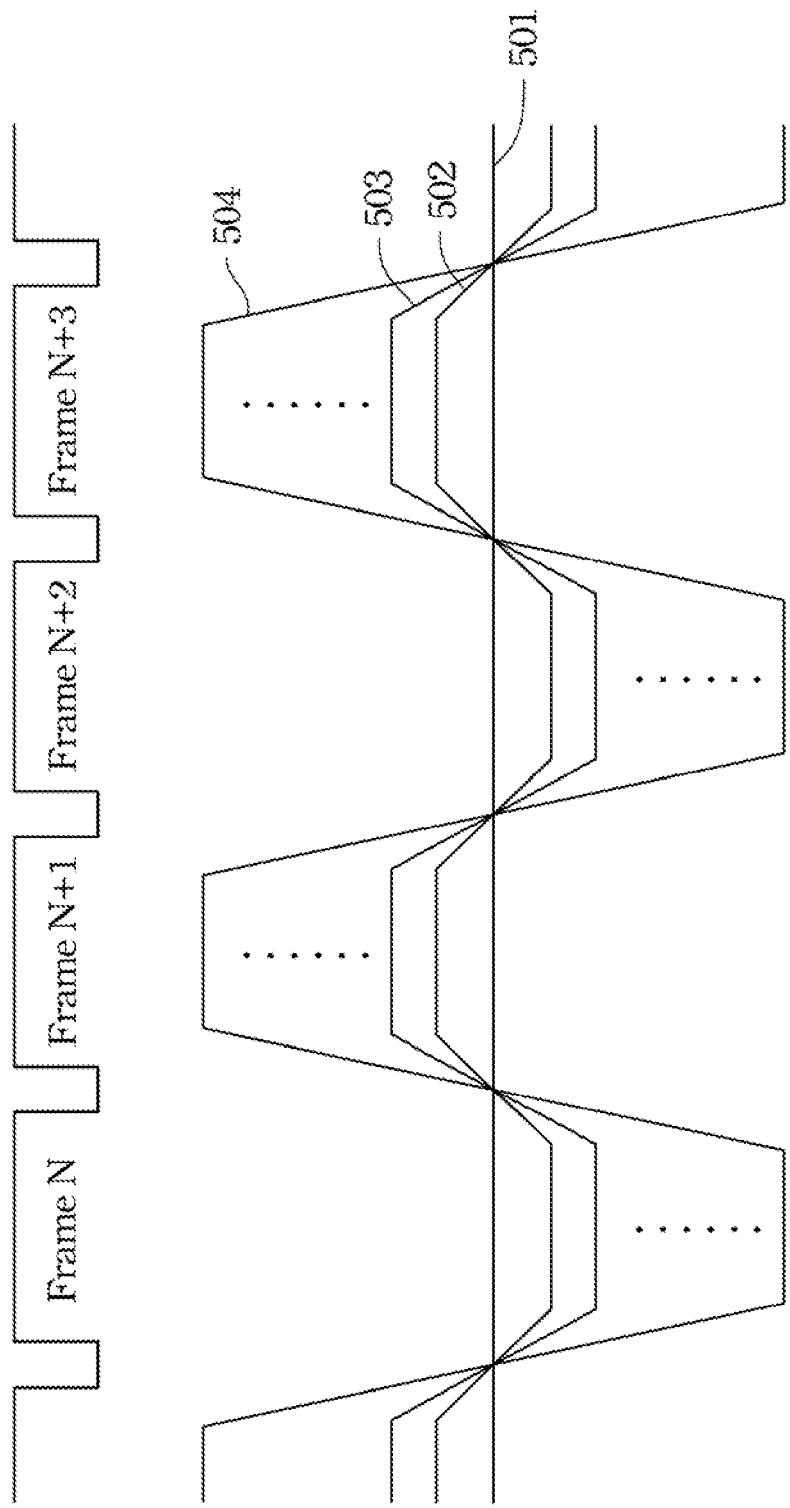
FIG. 5 illustrates the waveform of driving voltage in the frame inversion mode, in which a fixed voltage is applied to the common electrode.

FIG. 5 illustrates the waveform of driving voltage in the frame inversion mode for a liquid crystal display, in which a fixed voltage is applied to the common electrode. In a frame inversion mode, a fixed voltage 501 is applied to the common electrode. The driving voltage applied to the pixels is changed, such as the driving voltage 502, the driving voltage 503, the driving voltage 504 and so on. When different driving voltages 502, 503 or 504 are applied to the pixels, different gray levels are shown by the pixels. When the driving voltage is larger than the voltage applied to the common electrode, that is, the voltage difference between the driving voltage and the voltage applied to the common electrode is positive, a positive polarity voltage is applied to the pixels. When the driving voltage is less than the voltage applied to the common electrode, that is, the voltage difference between the driving voltage and the voltage applied to the common electrode is negative, a negative polarity voltage is applied to the pixels. For example, according to the driving voltage 502, the polarity of pixels is changed from positive (+) to negative (−) or from negative (−) to positive (+) in two adjacent frames.

Figure 6A:
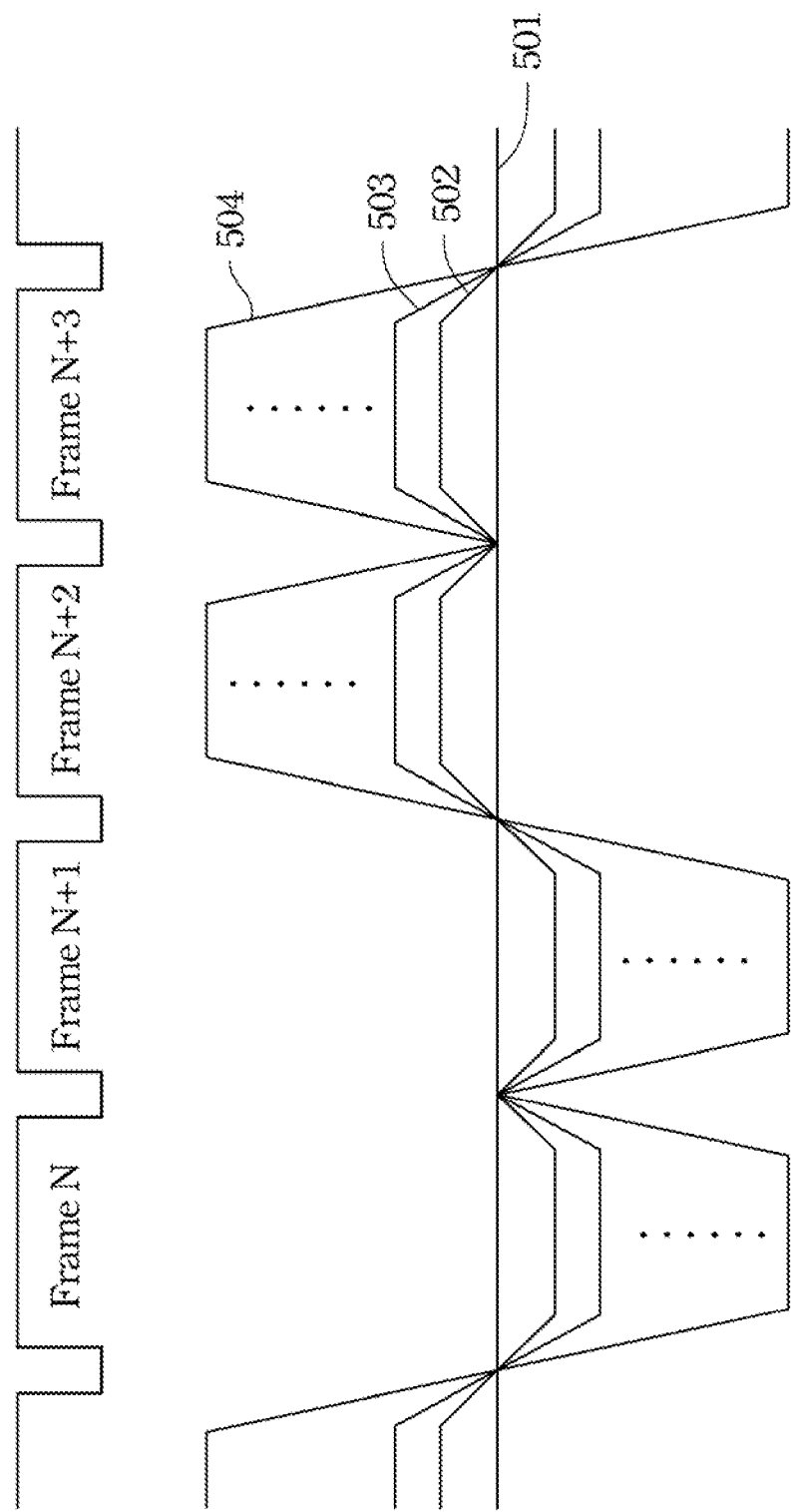
FIG. 6A illustrates the waveform of driving voltage in a multi-frame inversion mode, in which a fixed voltage is applied to the common electrode according to a preferred embodiment of the present invention.

FIG. 6A illustrates the waveform of driving voltage in the multi-frame inversion mode for a liquid crystal display according to an embodiment of the present invention, in which a fixed voltage is applied to the common electrode. In a multi-frame inversion mode, a fixed voltage 501 is applied to the common electrode. The driving voltage applied to the pixels is changed, such as the driving voltage 502, the driving voltage 503, the driving voltage 504 and so on. When different driving voltages 502, 503 or 504 are applied to the pixels, different gray levels are shown by the pixels. When the driving voltage is larger than the voltage applied to the common electrode, that is, the voltage difference between the driving voltage and the voltage applied to the common electrode is positive, a positive polarity voltage is applied to the pixels. When the driving voltage is less than the voltage applied to the common electrode, that is, the voltage difference between the driving voltage and the voltage applied to the common electrode is negative, a negative polarity voltage is applied to the pixels. In this embodiment, a driving voltage may apply a same polarity voltage to the pixels during at least two successive frames. For example, the driving voltage 502 applies a negative polarity voltage to two successive frames, frame (N) and frame (N+1). Then, the driving voltage 502 applies a positive polarity voltage to next two successive frames, frame (N+2) and frame (N+3).

Figure 6B:
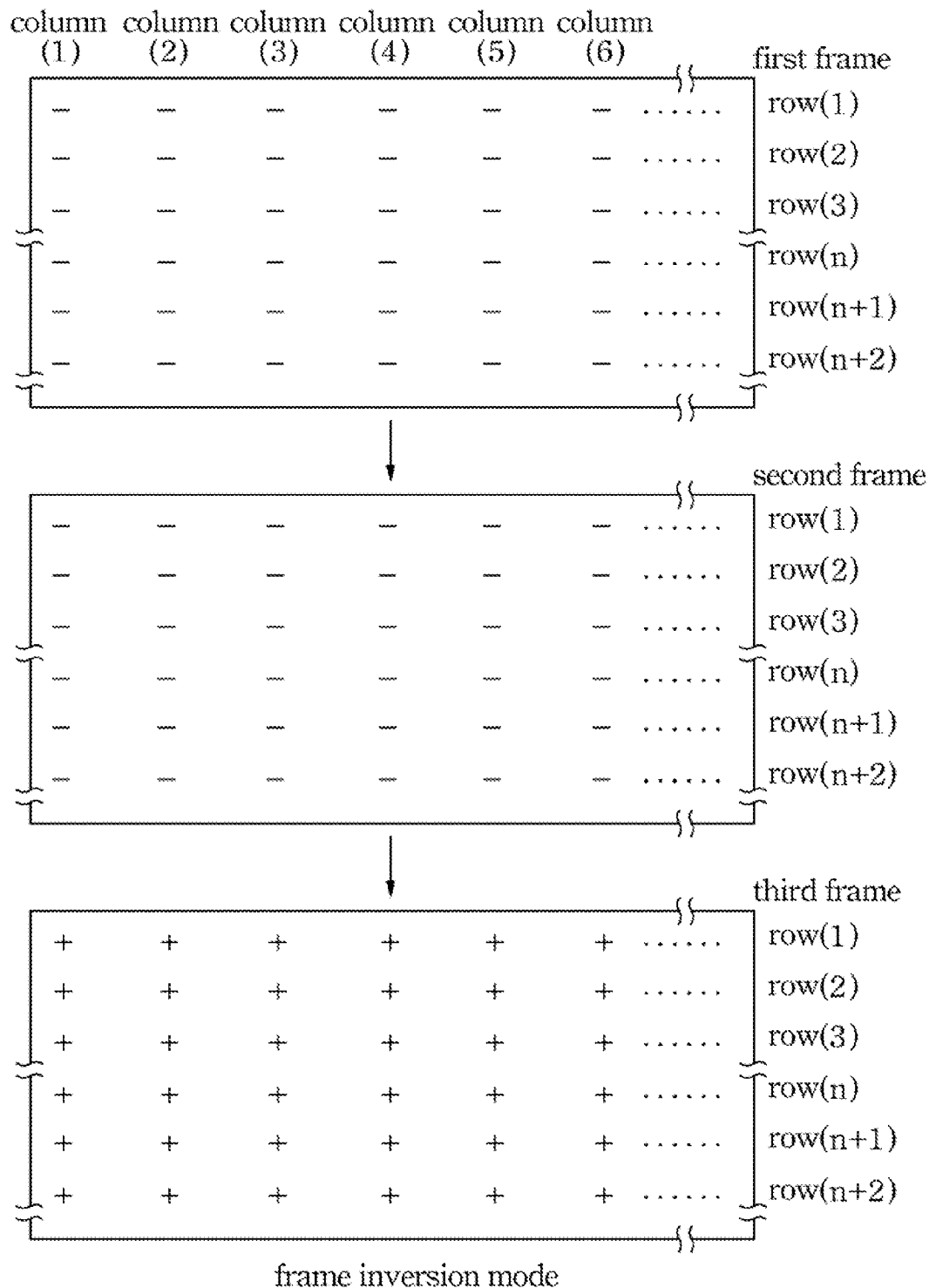
FIG. 6B illustrates the multi-frame inversion mode, the polarity of all sub-pixels in successive three frames, according to a preferred embodiment of the present invention.

FIG. 6B illustrates the multi-frame inversion mode, the polarity of all sub-pixels in successive three frames, according to a preferred embodiment of the present invention. In frame (N), the driving voltage is less than the voltage applied to the common electrode, that is, the voltage difference between the driving voltage and the voltage applied to the common electrode is negative, a negative polarity voltage is applied to the pixels. The polarity of all sub-pixels in the panel is negative. In frame (N+1), the driving voltage is still less than the voltage applied to the common electrode. Therefore, a negative polarity voltage is applied to the pixels. The polarity of all sub-pixels in the panel is negative. In frame (N+2), the driving voltage is changed to be larger than the voltage applied to the common electrode, that is, the voltage difference between the driving voltage and the voltage applied to the common electrode is changed to positive, a positive polarity voltage is applied to the pixels. The polarity of all sub-pixels in the panel is changed to positive. Accordingly, the driving method of the present invention reduces the number of the polarity of pixels changed from positive (+) to negative (−) or from negative (−) to positive (+). That is, according to typical frame inversion mode, the polarity of pixels has to be changed from positive (+) to negative (−) or from negative (−) to positive (+) when the present frame is switched to next frame. In other words, the liquid crystal molecule is inversed when the present frame is switched to next frame. However, according the multi-frame inversion mode of the present invention, the polarity of pixels is maintained in a same polarity during at least two successive frames. That is, it is not necessary to change the polarity of pixels during the at least two successive frames. In other words, the liquid crystal molecule is not inversed when the frame is switched. Accordingly, the number of the polarity of pixels changed from positive (+) to negative (−) or from negative (−) to positive (+) is reduced so that the power consumption is also reduced. It is noticed that a multi-frame inversion mode is used to explain the driving method of the present invention. However, the driving method of the present invention may be applied to a column inversion mode, a row inversion mode and a dot inversion mode.

For example, when the driving method of the present invention is applied to a column inversion mode, in frame (N), the driving voltage is less than the voltage applied to the common electrode, that is, the voltage difference between the driving voltage and the voltage applied to the common electrode is negative, a negative polarity voltage is applied to the pixels arranged in a same column, such as a first column. In frame (N+1), the driving voltage is still less than the voltage applied to the common electrode. Therefore, a negative polarity voltage is applied to the pixels arranged in the first column. In frame (N+2), the driving voltage is changed to he larger than the voltage applied to the common electrode, that is, the voltage difference between the driving voltage and the voltage applied to the common electrode is changed to positive, a positive polarity voltage is applied to the pixels arranged in the first column. In other words, the driving method of the present invention reduces the number of the polarity of pixels arranged in a same column changed from positive (+) to negative (−) or from negative (−) to positive (+).

FIG. 6C illustrates the multi-column inversion mode, the polarity of all sub-pixels in successive four frames, according to a preferred embodiment of the present invention. The polarity of pixels arranged in a same column is same. Moreover, the polarity of these pixels is maintained in a same polarity during at least two successive frames. For example, in frame (N), the driving voltage applied to the pixels arranged in column (1) is larger than the voltage applied to the common electrode. Therefore, a positive polarity voltage is applied to the pixels arranged in column (1). On the other hand, the driving voltage applied to the pixels arranged in column (2) is less than the voltage applied to the common electrode. Therefore, a negative polarity voltage is applied to the pixels arranged in column (2). In frame (N+1), the driving voltage applied to the pixels arranged in column (1) is still larger than the voltage applied to the common electrode. Therefore, a positive polarity voltage is applied to the pixels arranged in column (1) again. On the other hand, the driving voltage applied to the pixels arranged in column (2) is still less than the voltage applied to the common electrode. Therefore, a negative polarity voltage is applied to the pixels arranged in column (2) again. Next, in frame (N+2), the driving voltage applied to the pixels arranged in column (1) is changed to he less than the voltage applied to the common electrode. Therefore, a negative polarity voltage is applied to the pixels arranged in column (1). On the other hand, the driving voltage applied to the pixels arranged in column (2) is changed to be larger than the voltage applied to the common electrode. Therefore, a positive polarity voltage is applied to the pixels arranged in column (2). Next, in frame (N+3), the driving voltage applied to the pixels arranged in column (1) is maintained to be less than the voltage applied to the common electrode. Therefore, a negative polarity voltage is applied to the pixels arranged in column (1). On the other hand, the driving voltage applied to the pixels arranged in column (2) is maintained to be larger than the voltage applied to the common electrode. Therefore, a positive polarity voltage is applied to the pixels arranged in column (2). Accordingly, the driving method of the present invention reduces the number of the polarity of pixels arranged in same column changed from positive (+) to negative (−) or from negative (−) to positive (+). That is, according to typical column inversion mode, the polarity of pixels arranged in same column has to be changed from positive (+) to negative (−) or from negative (−) to positive (+) when the present frame is switched to next frame. However, according the multi-column inversion mode of the present invention, the polarity of pixels arranged in a same column is maintained in a same polarity during at least two successive frames. That is, it is not necessary to change the polarity of pixels arranged in a same column during the at least two successive frames. In other words, the liquid crystal molecule is not inversed when the frame is switched. Accordingly, the number of the polarity of pixels changed from positive (+) to negative (−) or from negative (−) to positive (+) is reduced so that the power consumption is also reduced.

FIG. 6D illustrates the multi-column inversion mode, the polarity of all sub-pixels in successive four frames, according to another preferred embodiment of the present invention. The polarity of pixels arranged in column (1), column (2) and column (3) is same. Moreover, the polarity of these pixels arranged in column (1), column (2) and column (3) is maintained in a same polarity during at least two successive frames. For example, in frame (N), the driving voltage applied to the pixels arranged in column (1), column (2) and column (3) is larger than the voltage applied to the common electrode. Therefore, a positive polarity voltage is applied to the pixels arranged in column (1), column (2) and column (3). On the other hand, the driving voltage applied to the pixels arranged in column (4), column (5) and column (6) is less than the voltage applied to the common electrode. Therefore, a negative polarity voltage is applied to the pixels arranged in column (4), column (5) and column (6). In frame (N+1), the driving voltage applied to the pixels arranged in column (1), column (2) and column (3) is still larger than the voltage applied to the common electrode. Therefore, a positive polarity voltage is applied to the pixels arranged in column (1), column (2) and column (3) again. On the other hand, the driving voltage applied to the pixels arranged in column (4), column (5) and column (6) is still less than the voltage applied to the common electrode. Therefore, a negative polarity voltage is applied to the pixels arranged in column (4), column (5) and column (6) again. Next, in frame (N+2), the driving voltage applied to the pixels arranged in column (1), column (2) and column (3) is changed to be less than the voltage applied to the common electrode. Therefore, a negative polarity voltage is applied to the pixels arranged in column (1), column (2) and column (3). On the other hand, the driving voltage applied to the pixels arranged in column (4), column (5) and column (6) is changed to be larger than the voltage applied to the common electrode. Therefore, a positive polarity voltage is applied to the pixels arranged in column (4), column (5) and column (6). Next, in frame (N+3), the driving voltage applied to the pixels arranged in column (1), column (2) and column (3) is maintained to be less than the voltage applied to the common electrode. Therefore, a negative polarity voltage is applied to the pixels arranged in column (1), column (2) and column (3). On the other hand, the driving voltage applied to the pixels arranged in column (4), column (5) and column (6) is maintained to be larger than the voltage applied to the common electrode. Therefore, a positive polarity voltage is applied to the pixels arranged in column (4), column (5) and column (6). Accordingly, the driving method of the present invention reduces the number of the polarity of pixels arranged in same column changed from positive (+) to negative (−) or from negative (−) to positive (+). That is, according the multi-column inversion mode of the present invention, the polarity of pixels arranged in a same column is maintained in a same polarity during at least two successive frames. Therefore, it is not necessary to change the polarity of pixels arranged in a same column during the at least two successive frames. In other words, the liquid crystal molecule is not inversed when the frame is switched. Accordingly, the power consumption is also reduced.

Moreover, the refresh rate of the polarity is changeable. For example, if the original refresh rate of the polarity is 60 Hz for a LCD, the driving method of the present invention may reduce the refresh rate of the polarity from 60 Hz to 30 Hz, or lower than 30 Hz, because this driving method reduces the number of the polarity of pixels changed from positive (+) to negative (−) or from negative (−) to positive (+). In other words, in an embodiment, the original refresh rate of the polarity is f Hz. The polarity of pixels is maintained in a same polarity during at least N successive frames. Then, the refresh rate of the polarity is reduced from f Hz to f/N Hz.

On the other hand, in the above embodiment, the polarity of pixels is maintained in a same polarity during at least two successive frames. However, in another embodiment, the polarity of pixels is maintained in a positive polarity during at least two successive frames. Then, the polarity of pixels is maintained in a negative polarity during at least three successive frames. In other words, according to the present invention, the polarity of pixels may be maintained in a positive or a negative polarity during any number of successive frames. The purpose of reducing power consumption may be reached as long as the polarity of pixels may be maintained in a same polarity during at least two successive frames.

Moreover, the driving method of the present invention also divides a frame into at least two time periods, the first time period and the second time period. In the first time period, the gate driver or/and the source driver is operated in a working state. In the second time period, the gate driver or/and the source driver is operated in a sleeping or in a non-working state. The source driver sends the data signal to the pixels only when the gate driver scans the scan lines in the pixels. That is, the source driver does not send any data signal to the pixels when the gate driver does not scan the scan lines in the pixels. In other words, the voltage and the current supplied to the source driver and the gate driver are reduced. Or a stopped or sleeping signal or a high impedance signal or an open circuit signal is supplied to the source driver and the gate driver. Therefore, the power consumption of a liquid crystal display may be reduced. In an embodiment, the first time period is less than 80% of the frame. In another embodiment, the first time period include a plurality of separately time segments. The gate driver and the scan driver are only drove at these time segments. Each time segment is less than 40% of the frame.

Figure 7:
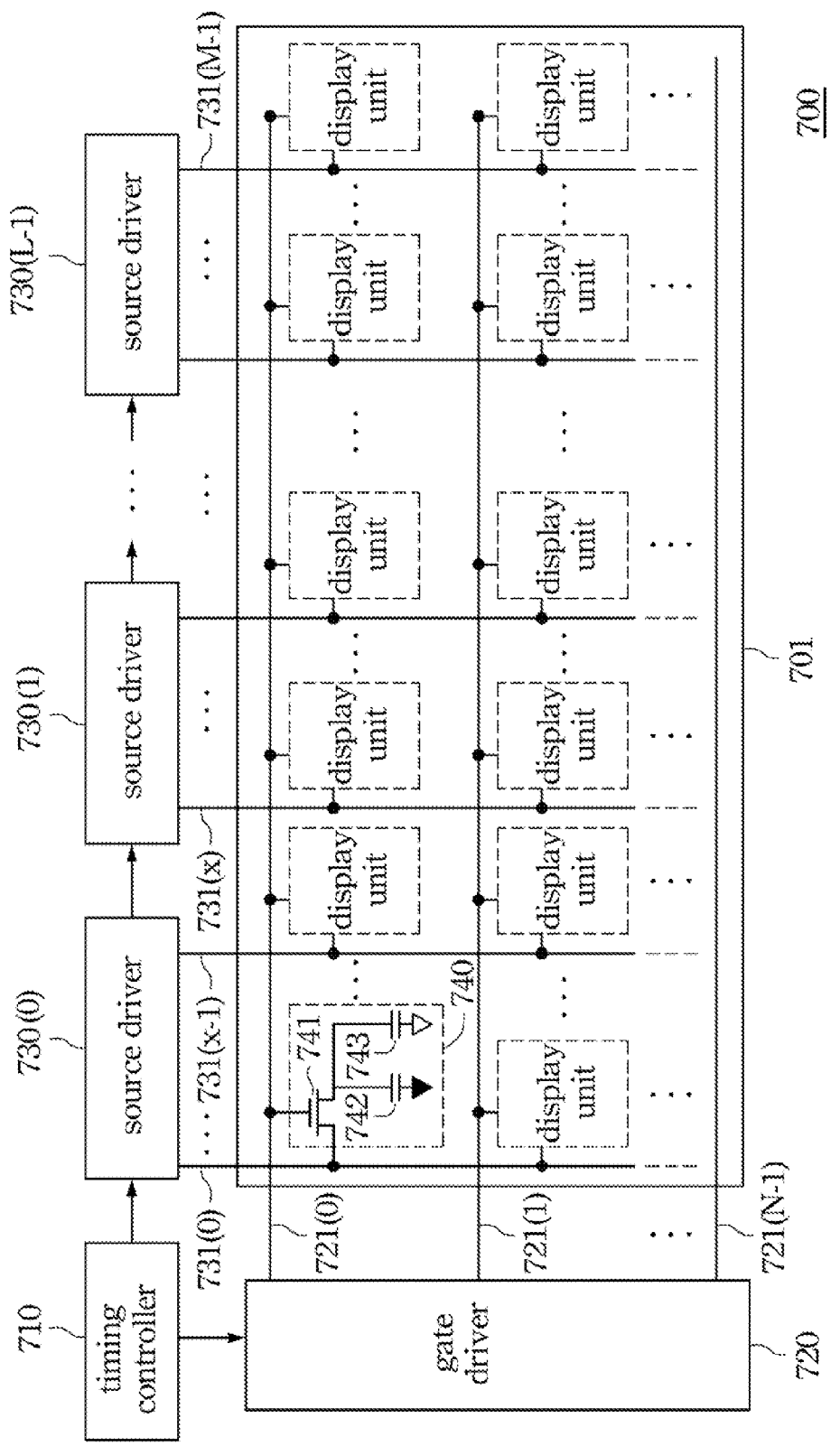
FIG. 7 illustrates a block diagram of a display according to a preferred embodiment of the present invention.

FIG. 7 illustrates a block diagram of a display according to a preferred embodiment of the present invention. Referring to FIG. 7, the display panel 701 of the panel display apparatus 700 comprises a display unit array. Each display unit is controlled by the source driver 730 and the gate driver 720 via the data lines 731(0) to 731(M−1) and the scan line 721(0) to 721(N), respectively. The source driver 730 comprises L source drivers 730(0) to 730(L−1), where L is a positive integer. Each of the source drivers 730(0) to 730(L−1) has X data output terminals. For example, the source driver 730(0) has 731(0)~731(X−1) data output terminals. The source drivers 730(0) to 730(L−1) drive the M data lines. Each display unit 740 has its respective switch 741 (e.g. TFT), liquid crystal capacitor 742 and storage capacitor 743. Wherein, the switch 741 transmits the data of the corresponding data line to the liquid crystal capacitor 742 and the storage capacitor 743 in response to the signal of the scan line. The liquid crystal capacitor 742 and the storage capacitor 743 stores the data of the data line in response to the common voltage Vcom and the storage voltage Vst, respectively. The source driver 730 drives the corresponding display unit based on the pixel data provided by a timing controller 710. With the control from the gate driver 720 and the source driver 730, each display unit displays a desired color at a desired time point. In one embodiment, the display is a liquid crystal display, an OED display, a MEMS display, an Electrophoresis display, an Electrowetting display, an active array display, or a silicon based display. Each pixel includes at least two thin film transistors, a two gates thin film transistors or a thin film transistor with a light doped drain electrode. In one embodiment, each pixel includes an amorphous silicon thin film transistors or an oxide thin film transistor.

Figure 8:
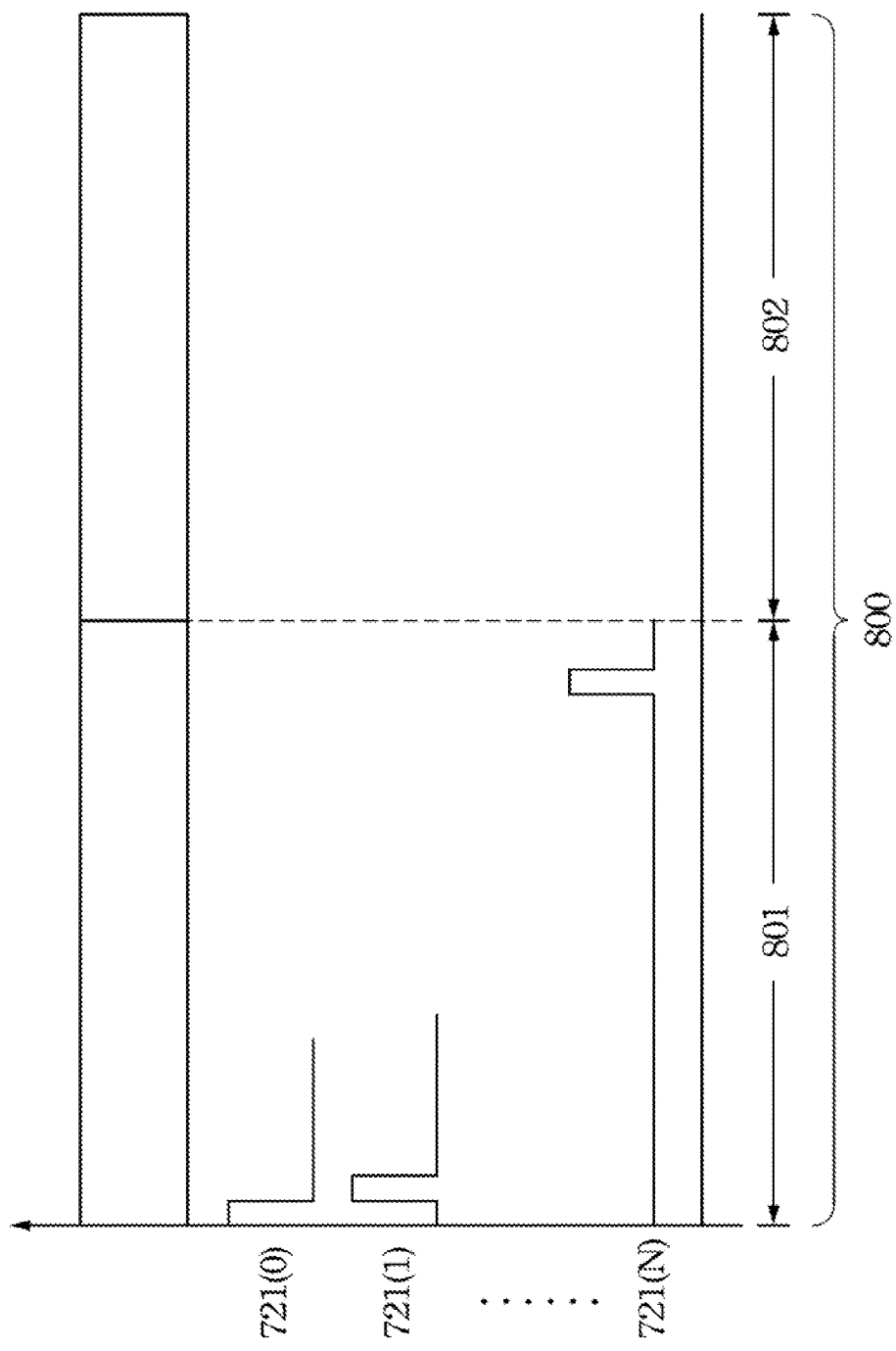
FIG. 8 illustrates a timing scheme diagram of a gate driver in a frame according to a preferred embodiment of the present invention.

FIG. 8 illustrates a timing scheme diagram of a gate driver in a frame according to a preferred embodiment of the present invention. Referring to FIG. 7 and FIG. 8, the frame 800 further comprises at least two time periods, a first time period 801 and a second time period 802. In the first time period 801, the gate driver or/and the source driver is operated in a working state. In the second time period 802, the gate driver or/and the source driver is operated in a sleeping or in a non-working state. In the first time period 801, the gate driver 720 scans the scan lines 721(0) to 721(N−1), and the source driver 730 sends the data signal to the data lines 731(0) to 731(M−1). In the second time period 802, the gate driver 720 stop scanning the scan lines 721(0) to 721(N−1), and the source driver 730 stop sending the data signal to the data lines 731(0) to 731(M−1). Therefore, in the second time period 802, the voltage and the current supplied to the source driver 730 and the gate driver 720 are reduced. Therefore, the power consumption of a liquid crystal display may be reduced.

In an embodiment, (the first time period 801)/(the first time period 802+the second time period 801) is larger than 0.3. In a preferred embodiment, (the first time period 801)/(the first time period 801+the second time period 802) is larger than 0.6. Moreover, in an embodiment, the power supplied to the source driver 730 and the gate driver 720 in the second time period is less than the power supplied to the source driver 730 and the gate driver 720 in the first time period. In another embodiment, an average power supplied to t the source driver 730 and the gate driver 720 in the second time period is less than an average power supplied to the source driver 730 and the gate driver 720 in the first time period.

Accordingly, according to the present invention, the timing control 710 controls the gate driver 720 scans the scan lines 721(0) to 721(N−1), and controls each source driver 730(0)~730(L−1) sends the data signal to the data lines 731(0) to 731(M−1) in the panel 701 in the first time period 801. After all the scan lines 721(0) to 721(N−1) are scanned, each source driver 730(0)~730(L−1) is disabled in the second time period 802. Therefore, each source driver 730(0)~730(L−1) stops sending the data signal to the data lines 731(0) to 731(M−1) in the panel 701. In this embodiment, after each source driver 730(0)~730(L−1) has sent the data signal of this frame to the data lines 731(0) to 731(M−1) in the panel 701, each source driver 730(0)~730(L−1) is disabled to stop sending the data signal to the panel 701. At this time, because of the storage capacitor 743, the image is still displayed in the panel 701. Moreover, the capacitance of the storage capacitor 743 is larger than that of the liquid crystal capacitor 742 to prevent the image distorted. In an embodiment, the capacitance of the storage capacitor 743 is more than ten times as larger as the liquid crystal capacitor 742. In another embodiment, the capacitance of the storage capacitor 743 is more than fifty times as larger as the liquid crystal capacitor 742. Accordingly, the gate driver 720 and the source driver 730 does not be continuously driven in a frame. That is, the gate driver 720 and the source driver 730 are only driven to send scan signal and data signal respectively in the first time period 801 in this embodiment. Both the gate driver 720 and the source driver 730 are operated in a sleeping state in the second time period 802 in this embodiment. In other words, the voltage and the current supplied to the gate driver 720 and the source driver 730 are reduced in the second time period 802. Therefore, the whole power consumption of a LCD is reduced.

For example, in an embodiment, the refresh rate of a liquid crystal display whose resolution is 1024×768 is reduced from 60 Hz to 10 Hz. The display time of a frame is increased from 16.67 ms (millisecond) to 100 ms. That is, the scan time for 768 scan lines is increased from 16.67 ms to 100 ms. For a typical driving method, the scan time of single scan line is increased from 21.7 us (microsecond) to 130 us. Therefore, for a typical driving method, although the refresh rate is reduced, the gate driver 720 and the source driver 730 are still driven to send scan signal and data signal respectively in a frame. In other words, the voltage and the current are continuously supplied to the gate driver 720 and the source driver 730 in a frame. Therefore, the whole power consumption of the gate driver 720 and the source driver 730 is not substantially reduced. At best the power consumption in switching the frames is reduced because of the reduced refresh rate.

However, according to the present invention, the refresh rate of a liquid to crystal display whose resolution is 1024×768 is reduced from 60 Hz to 10 Hz. The display time of a frame is increased from 16.67 ms (millisecond) to 100 ms. That is, the scan time for 768 scan lines is increased from 16.67 ms to 100 ms. According to the driving method of the present invention, the scan time of single scan line is maintained in 21.7 us (microsecond). That is, the scan time for 768 scan lines is maintained in 16.67 ms. In the other time period, 83.33 ms (100 ms-16.67 ms), both the gate driver 720 and the source driver 730 are operated in a sleeping state. That is, the voltage and the current supplied to the gate driver 720 and the source driver 730 are reduced in the 83.33 ms time period. Therefore, the whole power consumption of the gate driver 720 and the source driver 730 is reduced.

On the other hand, when the source driver 730 switches the polarity of an image signal in a first frequency, the gate driver 720 drives the scan lines in a second frequency. The second frequency is larger than the first frequency. The first frequency is 0.1 Hz to 30 Hz. The second frequency is 40 Hz to 200 Hz.

Moreover, it is noticed that the 21.7 us scan time for single scan line is only an example for explaining the present invention. The whole power consumption of the gate driver 720 and the source driver 730 is still reduced as long as the scan time for 768 scan lines is less than 100 ms. That is, both the gate driver 720 and the source driver 730 are not driven in some time period of the 100 ms. In other words, in the some time period, the voltage and the current supplied to the gate driver 720 and the source driver 730 are stopped or reduced. Therefore, the whole power consumption of the gate driver 720 and the source driver 730 is reduced. Moreover, in another embodiment, all scan lines, the 768 scan lines, may be grouped into at least two groups and the two groups of scan lines are scanned in two separated scanning time periods in a frame. A sleeping time period is arranged between the two scanning time periods. In the sleeping time period, the voltage and the current supplied to the gate driver 720 and the source driver 730 are stopped or reduced.

It is noticed that, the frame 800 in the above is divided into a first time period 801 and a second time period 802. In the first time period 801, the gate driver 720 or/and the source driver 730 is operated in a working state. In the second time period 802, the gate driver 720 or/and the source driver 730 is operated in a sleeping or in a non-working state. However, in another embodiment, all scan lines may be grouped into at least two groups and the two groups of scan lines are scanned in two separated scanning time periods in a frame. For example, the scan lines 721(0)~721(N−1) are grouped into at least two groups, a first scan line group and a second scan line group. The two groups of scan lines are scanned in two separated scanning time periods in a frame by the gate diver 720. A sleeping time period is arranged between the two scanning time periods. The gate driver 720 scans scan lines of the first scan line group, and the source driver 730 sends corresponding data signals to the pixels scanned by the data driver 720. Then, the gate driver 720 and the source driver 730 are disabled in the sleeping time period. That is, the voltage and the current supplied to the gate driver 720 and the source driver 730 are stopped or reduced in the sleeping time period. Next, the gate driver 720 scans scan lines of the second scan line group, and the source driver 730 sends corresponding data signals to the pixels scanned by the data driver 720. Accordingly, the frame includes a sleeping time period and the gate driver 720 and the source driver 730 are disabled in the sleeping time period. That is, the voltage and the current supplied to the gate driver 720 and the source driver 730 are stopped or reduced in the sleeping time period. Therefore, the whole power consumption is reduced.

Figure 9:
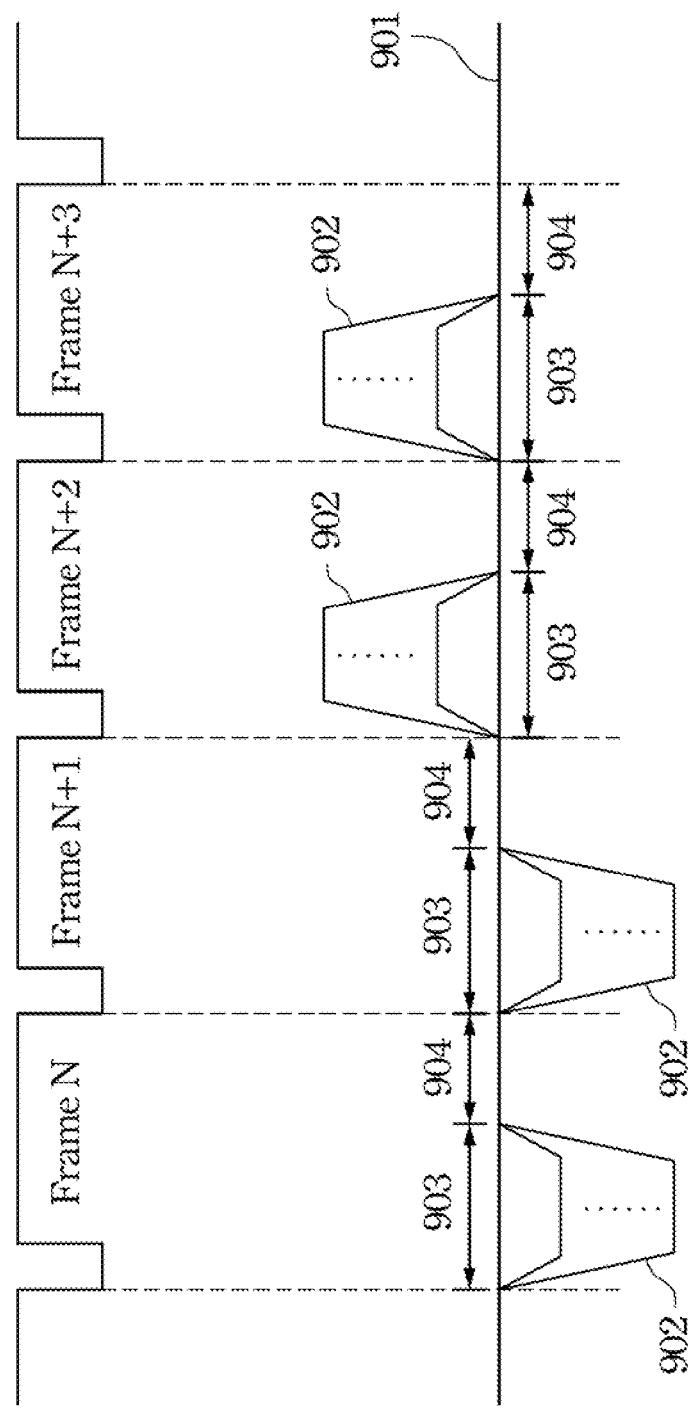
FIG. 9 illustrates a timing scheme diagram to drive the liquid crystal molecule.

On the other hand, the above driving method is also applied to a multi-frame inversion mode, a multi-column inversion mode, a multi-row inversion mode and a multi-dot inversion mode of the present invention. For example, the above driving method is applied to a multi-frame inversion mode. Referring to FIG. 7 and FIG. 9, a frame N is divided into two time periods, a first time period 903 and a second time period 904. In the first time period 903, the gate driver or/and the source driver is operated in a working state. In the second time period 904, the gate driver or/and the source driver is operated in a sleeping or in a non-working state. In the first time period 903 of the frame N, the source driver 730 sends a data signal 902 with a voltage less than that of the common electrode 901. Therefore, the polarity of all pixels in the panel is negative. In the second time period 904 of the frame N, the voltage supplied to the gate driver 720 and the source driver 730 is stopped or is reduced. Similarly, in the first time period 903 of the frame N+1, the source driver 730 sends a data signal 902 with a voltage less than that of the common electrode 901. Therefore, the polarity of all pixels in the panel is negative. In the second time period 904 of the frame N+1 the voltage supplied to the gate driver 720 and the source driver 730 is stopped or is reduced. Next, in the first time period 903 of the frame N+2, the source driver 730 sends a data signal 902 with a voltage larger than that of the common electrode 901. Therefore, the polarity of all pixels in the panel is changed to be positive. In the second time period 904 of the frame N+2, the voltage supplied to the gate driver 720 and the source driver 730 is stopped or is reduced. The rest may be deduced by analogy. Accordingly, a sleeping time period is set in a frame. In the sleeping time period, the voltage and the current supplied to the gate driver 720 and the source driver 730 is stopped or is reduced. Therefore, the power consumption of the gate driver 720 and the source driver 730 is reduced. Moreover, the polarity of pixels is maintained during at least two frames. That is, the number of the polarity of pixels changed from positive (+) to negative (−) or from negative (−) to positive (+) is reduced. Therefore, the power consumption of the gate driver 720 and the source driver 730 is further reduced.

Accordingly, the driving method of the present invention reduces the number of the polarity of pixels changed from positive (+) to negative (−) or from negative (−) to positive (+). Moreover, the driving method of the present invention also divides the frame into at least two time periods, the first time period and the second time period. In the first time period, the gate driver or/and the source driver is operated in a working state. In the second time period, the gate driver or/and the source driver is operated in a sleeping or in a non-working state. In the sleeping or non-working state, the voltage or the current supplied to the source driver and the gate driver are stopped or reduced. Therefore, the power consumption of a liquid crystal display may be reduced. Moreover, the driving method is performed by a timing controller or/and a driver of a display. Therefore, it is not necessary to form a new device in the display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving method for a display, wherein the display includes a first driver, a second driver, a plurality of first signal lines coupling with the first driver, and a plurality of second signal lines coupling with the second driver, the first signal lines cross the second signal lines to form a pixel array with a plurality of pixels, comprising:
   driving the display in a first frame rate;
   applying an image signal with a polarity to the pixel array, wherein the polarity is a first polarity or a second polarity opposite to the first polarity, further comprises:
   sequentially scanning the first signal lines by the first driver, wherein each of frames consists of a first time period and a second time period, and the second time period follows the first time period, wherein each of the first signal lines is scanned once in each of the frames and is sequentially scanned in the first time period in each of the frames according to the first frame rate, wherein a time for scanning each of the first signal lines is a first scanning time;
   applying the image signal through the second signal lines by the second driver to the pixels connected to the first signal lines that are scanned in the first time period in each of the frames;
   stopping scanning the first signal lines by the first driver in the second time period in each of the frames; and
   stopping applying the image signal through the second signal lines to the some pixels of the pixel array in the second time period in each of the frames; and
   maintaining the image signal applied to the some pixels of the pixel array in a same polarity during two successive frames,
   wherein when the first frame rate of the display is reduced to a second frame rate, a time for scanning each of the first signal lines in the first time period in each of the frames is maintained in the first scanning time.

2. The driving method of claim 1, further comprising to maintain the image signal applied to pixels arranged in a same first signal lines or a same second signal lines of the pixel array in a same polarity during two successive frames.

3. The driving method of claim 1, further comprising to maintain the image signal applied to at least one pixel or pixels arranged in a same row or line of the pixel array a same polarity during at least six successive frames.

4. The driving method of claim 1, wherein
   stopping scanning the first signal lines and stopping applying the image signal to the some pixels of the pixel array further comprises applying a stopped signal or a sleeping signal or a high impedance signal or an open circuit signal to the first driver and the second driver.

5. The driving method of claim 1, further comprising:
   the first driver selects the some or all pixels of the pixel array through the second signal lines; and
   the second driver applies the image signal to the some or all pixels through the first lines signals.

6. The driving method of claim 5, wherein the voltage and the current supplied to the second driver and the first driver in the second time period is stopped or sleeping and/or is reduced, or a high impedance signal or an open circuit signal is supplied to the second driver and the first driver.

7. The driving method of claim 6, wherein power supplied to the second driver and the first driver in the second time period is less than power supplied to the second driver and the first driver in the first time period.

8. The driving method of claim 1, wherein the frame includes a plurality of a first time period on and a second time period.

9. The driving method of claim 1, wherein the step to apply voltage signal to the pixel array further comprises:
   dividing the pixel array into a plurality sub-pixel arrays;
   applying image signal to the sub-pixel arrays respectively during a plurality of separated time periods in a frame;
   stopping applying the image signal to the sub-pixel arrays respectively between two adjacent time periods in the frame or applying a high impedance signal or an open circuit signal.

10. The driving method of claim 1, wherein applying an image signal to the pixel array further comprises:

applying the first polarity signal and the second polarity signal to the pixels arranged in any two adjacent column, any two adjacent rows or any two adjacent pixels of the pixel array.

11. The driving method of claim 1, wherein applying an image signal to the pixel array further comprises:
applying the first polarity signal or the second polarity signal to the all pixels in the pixel array.

12. The driving method of claim 1, when the frames of the display are switched in a first frequency, the second driver drives the second signal lines in a second frequency, wherein the second frequency is larger than the first frequency.

13. The driving method of claim 1, wherein the display is a liquid crystal display, an OLED display, a MEMS display, an Electrophoresis display, an Electrowetting display, an active array display, or a silicon based display.

14. A driving method for a display, wherein the display includes a first driver, a second driver, a plurality of first signal lines coupling with the first driver, and a plurality of second signal lines coupling with the second driver, the first signal lines cross the second signal lines to form a pixel array with a plurality of pixels, comprising:
driving the display in a first frame rate;
applying an image signal with a polarity to some pixels of the pixel array, further comprising:
sequentially scanning the first signal lines by the first driver, wherein each of frames consists of a first time period and a second time period, and the second time period follows the first time period, wherein each of the first signal lines is scanned once in each of the frames and is sequentially scanned in the first time period in each of the frames according to the first frame rate, wherein a time for scanning each of the first signal lines is a first scanning time;
applying the image signal through the second signal lines by the second drivers to the pixels connected to the first signal lines that are scanned in the first time period in each of the frames;
stopping scanning the first signal lines by the first driver in the second time period in each of the frames; and
stopping applying the image signal through the second signal lines to the some pixels in the second time period in each of the frames,
wherein when the first frame rate of the display is reduced to a second frame rate, a time for scanning each of the first signal lines in the first time period in each of the frames is maintained in the first scanning time.

15. The driving method of claim 14, wherein the frame includes a plurality of the first time period and the second time period.

16. The driving method of claim 14, wherein the first driver selects the some pixels of the pixel array through the second signal lines, and the second driver applies the image signal to the some pixels through the first lines signals.

17. The driving method of claim 14, wherein stopping scanning the first signal lines and stopping applying the image signal to the some pixels further comprises applying a stopped signal or a sleeping signal or a high impedance signal or an open circuit signal to the second driver and the first driver.

18. The driving method of claim 14, wherein the first driver and the second driver is in a sleeping state or a non-working state in the second time period.

19. The driving method of claim 14, wherein power supplied to the second driver and the first driver in the second time period is less than power supplied to the second driver and the first driver in the first time period.

20. The driving method of claim 14, wherein applying an image signal with a polarity to some pixels further comprising:
applying an image signal with a polarity to the pixel array, wherein the polarity is a first polarity or a second polarity opposite to the first polarity; and
maintaining the image signal applied to at least one pixel of the pixel array in a same polarity during two successive frames.

21. he driving method of claim 14, wherein when a polarity of the image signal is switched in a first frequency, the second driver drives the second signal lines in a second frequency, wherein the second frequency is larger than the first frequency.

22. The driving method of claim 14, wherein the display apparatus is a liquid crystal display, an OLED display, a MEMS display, an Electrophoresis display, an Electrowetting display, an active array display, or a silicon based display.

* * * * *